US012719687B2

(12) United States Patent
Setty et al.

(10) Patent No.: US 12,719,687 B2
(45) Date of Patent: Aug. 25, 2026

(54) VERIFIABLE, DECENTRALIZED ZERO-KNOWLEDGE CENTRAL BANK DIGITAL CURRENCY

(71) Applicant: Microsoft Technology Licensing, LLC, Redmond, WA (US)

(72) Inventors: Srinath Setty, Redmond, WA (US); Weidong Cui, Bellevue, WA (US); Yan Zhang, Beijing (CN); Fei Xu, Beijing (CN); Qi Zhang, Beijing (CN); Feng Sun, Beijing (CN); Jingchang Sun, Beijing (CN); Han Li, Suzhou (CN); Jia Wei, Beijing (CN); Kanwen Li, Suzhou (CN); Chenxin Yan, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/036,642

(22) Filed: Jan. 24, 2025

(65) Prior Publication Data

US 2026/0222208 A1 Jul. 30, 2026

(51) Int. Cl.
*H04L 9/32* (2006.01)
*G06Q 20/38* (2012.01)

(52) U.S. Cl.
CPC ......... *H04L 9/3218* (2013.01); *G06Q 20/389* (2013.01); *H04L 2209/56* (2013.01)

(58) Field of Classification Search
CPC .. H04L 9/3218; H04L 2209/56; G06Q 20/389
USPC ........................................................... 705/64
See application file for complete search history.

(56) References Cited

U.S. PATENT DOCUMENTS

| | | | | |
|---|---|---|---|---|
| 10,652,019 | B1 * | 5/2020 | Nicolas | H04L 9/3239 |
| 2022/0014502 | A1 * | 1/2022 | Gauthier | H04L 9/30 |
| 2022/0051240 | A1 * | 2/2022 | Shamai | G06Q 20/405 |
| 2024/0202679 | A1 * | 6/2024 | Mayerchak | H04L 9/50 |
| 2025/0061446 | A1 * | 2/2025 | Wu | G06Q 20/3825 |
| 2025/0182109 | A1 * | 6/2025 | Boyraz | G06Q 20/3829 |

* cited by examiner

*Primary Examiner* — Courtney P Jones
(74) *Attorney, Agent, or Firm* — NovoTechIP International PLLC

(57) ABSTRACT

A zero-knowledge CBDC (zkCBDC) banking system uses zero-knowledge proofs to prove that commercial banks are processing transactions correctly. Commercial banks are the provers of the zero-knowledge proof system. The banks generate a zero-knowledge proof for one or more transactions processed by the bank. The banks also generate a hash of the total amount of the transaction(s). The zero-knowledge proof and associated transaction hash are submitted to a blockchain. The blockchain stores a bank state commitment value for each commercial bank in the system and includes a smart contract with code for verifying the zero-knowledge proofs. Once a proof is verified, the bank's state commitment value is updated and the transaction hash is added to the verifier's state.

20 Claims, 7 Drawing Sheets

VERIFIABLE, DECENTRALIZED ZERO-KNOWLEDGE CENTRAL BANK DIGITAL CURRENCY

BACKGROUND

There are a number of challenges which must be taken into consideration in implementing central bank digital currencies (CBDCs). For example, one primary concern is maintaining privacy of transactions. Unlike cash, which allows for anonymous transactions, digital currencies inherently create a record of every transaction which makes confidentiality difficult to ensure. System integrity and transparency are also concerns as there are limited means for verifying that a CBDC banking system is processing transactions correctly that do not require access to the internal working of the banking system. Security is also a concern in CBDC banking systems as commercial banks may provide central points of vulnerability which are attractive targets for cyber-attacks.

Hence, what is needed is a method of providing CBDC banking systems with improved privacy of transactions, that enable system correctness to be verified by anyone in the system, and that eliminates central points of attack so that the banking system is less vulnerable to cyber-attacks.

SUMMARY

In one general aspect, the instant disclosure presents a data processing system having a processor and a memory in communication with the processor wherein the memory stores executable instructions that, when executed by the processor alone or in combination with other processors, cause the data processing system to perform multiple functions. The function may include receiving transaction information at a commercial bank of the CBDC banking system, the transaction information including instructions for performing at least one transaction, the instructions indicating an amount of CBDCs involved in each transaction, a transaction type for each transaction, and an account involved in each transaction; processing the at least one transaction using a transaction processing system of the commercial bank; providing a transaction amount pertaining to the at least one transaction to a predetermined hash function; generating a transaction hash for the at least one transaction using the predetermined hash function; generating a zero-knowledge proof for the at least one transaction using a zero-knowledge proof generating component; submitting the zero-knowledge proof and the transaction hash to a blockchain of the CBDC banking system, the blockchain storing a bank state commitment value for the bank; verifying the zero-knowledge proof using a smart contract stored on the blockchain, the smart contract including code for verifying zero-knowledge proofs; validating the zero-knowledge proof and the transaction hash using nodes of the blockchain; and in response to the validation of the zero-knowledge proof and the transaction hash, updating the bank state commitment value in the blockchain along with adding the transaction hash to the verifier's state.

In yet another general aspect, the instant disclosure presents a method of processing transactions in a central bank digital currency (CBDC) banking system. The method including receiving transaction information at a commercial bank of the CBDC banking system, the transaction information including instructions for performing at least one transaction, the instructions indicating an amount of CBDCs involved in each transaction, a transaction type for each transaction, and an account involved in each transaction; processing the at least one transaction using a transaction processing system of the commercial bank; providing a transaction amount pertaining to the at least one transaction to a predetermined hash function; generating a transaction hash for the at least one transaction using the predetermined hash function; generating a zero-knowledge proof for the at least one transaction that includes the transaction hash; submitting the zero-knowledge proof to a blockchain of the CBDC banking system, the blockchain storing current a bank state commitment value for the bank; verifying the zero-knowledge proof using a smart contract stored on the blockchain, the smart contract including code for verifying zero-knowledge proofs; validating the zero-knowledge proof and the transaction hash using nodes of the blockchain; and, in response to the validation of the zero-knowledge proof and the transaction hash, updating the bank state commitment value in the blockchain along with adding the transaction hash to the verifier's state.

In a further general aspect, the instant application describes a non-transitory computer readable medium on which are stored instructions that when executed cause a programmable device to perform functions of receiving transaction information at a bank of the CBDC banking system, the transaction information including instructions for performing at least one transaction, the instructions indicating an amount of CBDCs involved in each transaction, a transaction type for each transaction, and an account involved in each transaction; processing the at least one transaction using a transaction processing system of the bank; providing a transaction amount pertaining to the at least one transaction to predetermined hash function; generating a transaction hash for the at least one transaction using the predetermined hash function; generating a zero-knowledge proof for the at least one transaction that includes the transaction hash; submitting the zero-knowledge proof to a blockchain of the CBDC banking system, the blockchain storing current a bank state commitment value for the bank; verifying the zero-knowledge proof using a smart contract stored in the blockchain, the smart contract including code for verifying zero-knowledge proofs; validating the zero-knowledge proof and the transaction hash using nodes of the blockchain; and in response to the validation of the zero-knowledge proof and the transaction hash, updating the bank state commitment value in the blockchain along with adding the transaction hash to the verifier's state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
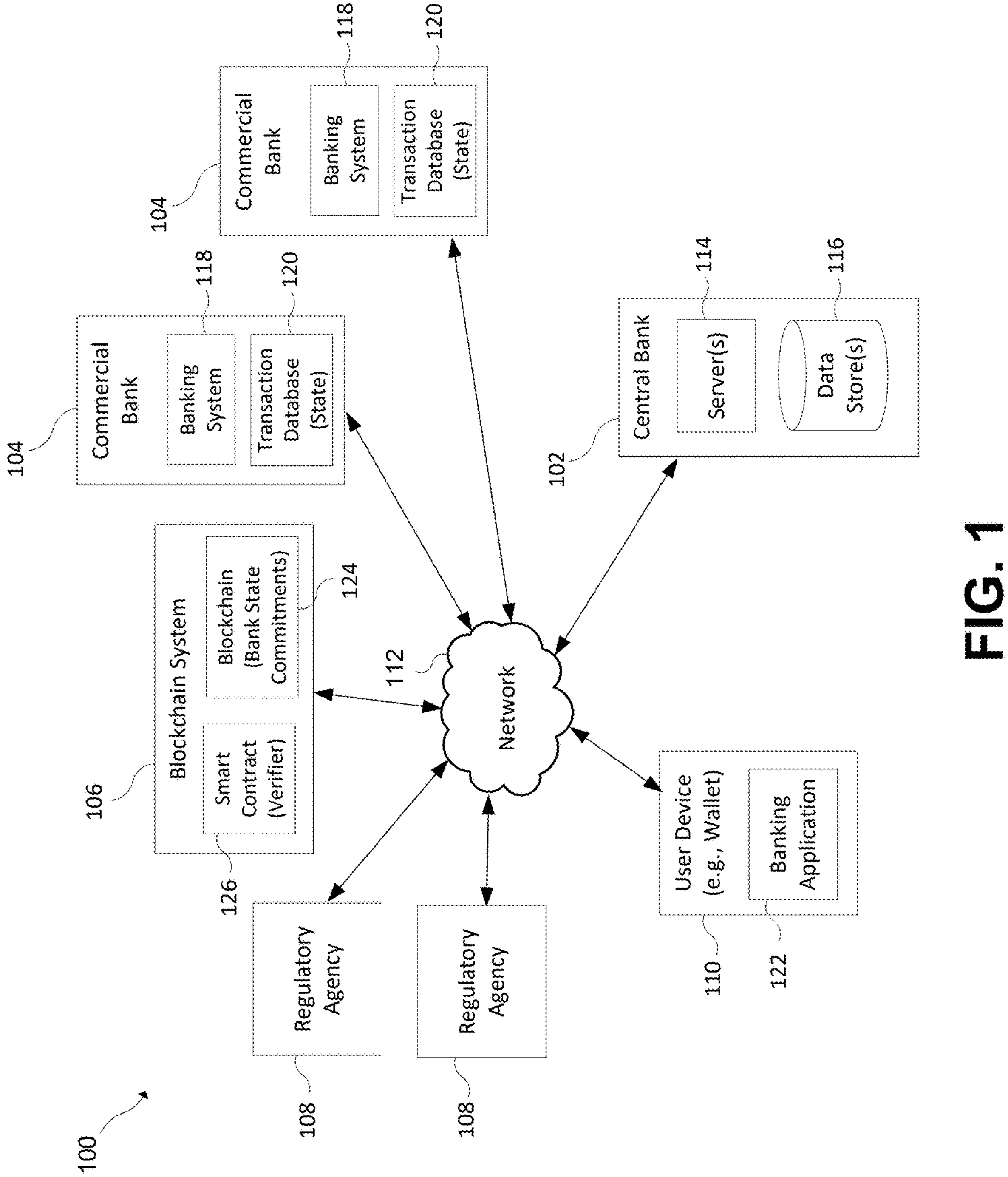
FIG. 1 depicts an example computing environment upon which aspects of this disclosure may be implemented.

Central bank digital currencies (CBDC) is a digital form of a nation's fiat currency issued and regulated by its central bank. Fiat currency is a government-issued currency that is not backed by a physical commodity, such as gold or silver. Instead, its value is derived from the public's trust in the government that issued it, as well as factors like supply and demand, interest rates, and the money supply. Fiat currency is the standard for most of the world's major currencies, including the U.S. dollar and the euro. Unlike traditional cryptocurrencies like Bitcoin, which operate on decentralized networks, CBDCs are centralized and backed by the government, ensuring their status as legal tender. They aim to modernize payment systems, reduce reliance on cash, and enhance the efficiency of both domestic and cross-border transactions. CBDCs can be designed for retail use by the general public or wholesale use by financial institutions.

CDBC banking systems enable cross-bank transfers and swaps which can be faster, more efficient, and potentially less costly than traditional transactions. A cross-bank CBDC transfer involves transferring CBDC from one bank to another. CBDC swaps refer to exchange or conversion of one type of CBDC for another type of CBDC. For example, a swap may be used to convert one country's CBDC into another country's CBDC (e.g., cross-border payments). In addition, a CBDC system can include various types of assets, such as bonds, treasury bills, and the like. Swaps can be performed exchange an asset with digital currency. CBDC transfers and swaps can be performed in substantially real-time and require fewer intermediaries which can make transactions faster and less costly than traditional banking transactions.

There are a number of challenges and concerns which must be taken into consideration in implementing and securing CBDC systems. For example, one primary concern in implementing CBDC systems is maintaining confidentiality of transactions and transaction participants. Unlike cash, which allows for anonymous transactions, digital currencies inherently create a record of every transaction. Measures must be taken to control access to transaction details so only the participants (and the banks) involved in the transaction are capable of accessing transaction details. Another challenge faced in implementing CBDC systems is providing mechanisms for verifying the correctness of the system (without allowing access to transaction details) that are available to anyone. Enabling anyone to verify the correctness of the system adds transparency which can improve trust and promote adoption of CBDCs. The transparency also facilitates the detection of fraudulent and criminal activity as they occur so measures can be taken to prevent or mitigate such activity.

Security of CBDC banking systems is an ongoing concern. One way to improve security of these systems is through decentralization. Decentralization refers to of the distribution of critical system components and assets from a single system or network to a distributed system or network. Decentralization can prevent central points of vulnerability to cyber-attacks which can improve the overall security of the system. Therefore, finding ways to improve decentralization of CBDC banking systems in order to improve overall security is an important challenge faced in implementing CBDC banking systems.

One way of implementing CBDC systems is on the central bank's machines. Implementing the system in this manner makes it easier to maintain confidentiality of transactions but makes it difficult to provide mechanisms for allowing anyone to verify correctness of the system. This is a centralized implementation so the system may have central points of attack which increase the vulnerability of the system to cyberattacks. Another method of implementing CBDC systems is through the use of blockchain technology. Blockchain technology is inherently decentralized so that central points of attach are avoided. Blockchain technology also provides mechanisms for verifying correctness of the system. However, blockchain technology typically results in transaction data, including transaction participant information, being accessible to anyone. The use of blockchain technology therefore makes it difficult to maintain the privacy of transactions in the CBDC system.

Finding ways to implement CBDC systems that maintain privacy of transactions and transaction participants while at the same time allowing anyone to verify the correctness of the system and that do not provide central points via which hackers can attempt to attack the system is a technical problem that requires a technical solution. To address this technical problem, this description provides technical solutions in the form of a zero-knowledge CBDC (zkCBDC) banking system in which commercial banks produce zero-knowledge proofs that they are processing transactions correctly. Zero-knowledge proofs are a cryptographic technique that allows one party (the prover) to prove to another party (the verifier) that a claim or statement is true without revealing any specific information about the claim or statement itself. In the context of this application, the provers are the commercial banks and the verifier is the blockchain system. The zero-knowledge proofs are used to prove that commercial banks are processing transactions correctly.

Zero-knowledge proofs are generated for a commercial bank by providing the amount of CBDCs associated with at least one transaction processed by the commercial bank as input to a predetermined hash function. The hash function outputs a transaction hash that is representative of the at least one transaction. Zero-knowledge proofs are submitted to a blockchain to prove that the commercial bank has processed the transaction correctly. The blockchain includes a verifier in the form of a smart contract. The smart contract includes code for verifying proofs. The code implements the verifier of the chosen zero-knowledge proof system, and includes at least one verification value, such as a public key, to use with the verification scheme to verify proofs. Verification values are provided by the central bank. The smart contract also cryptographically encodes rules of transaction processing (e.g., no creation or destruction of money, no double spends, etc.). Nodes of the blockchain can validate proofs. In this case, the central bank and regulatory agencies can serve as nodes of the blockchain to validate proofs. The smart contract stores a bank state commitment value on the blockchain for each commercial bank in the CBDC banking system. Once a proof from a commercial bank is verified by the smart contract and validated by the nodes, the smart contract updates the current state commitment value to include the transaction hash associated with the proof.

By adding blockchain technology and zero-knowledge proofs to a CBDC banking system, the resulting zkCBDC banking system enables anyone in the system to verify the end-to-end correctness of the system. Only participants of a transaction can see the details of transactions, and the system is decentralized so that it has no central points of vulnerability which can be targeted for security attacks. The blockchain also enables bank-to-bank transfers and swaps to be performed using two-phase commit algorithms so that security and privacy can be provided for the performance of bank-to-bank transactions.

FIG. 1 illustrates an example zkCBDC banking system upon which aspects of the disclosure are implemented. The zkCBDC banking system 100 includes a central bank 102, a plurality of commercial banks 104, a blockchain system 106, at least one regulatory agency 108, and at least one user device 110 with each other via a network 112. The network 112 includes one or more wired, wireless, and/or a combination of wired and wireless networks. The network 112 may include one or more local area networks (LAN), wide area networks (WAN) (e.g., the Internet), public networks, private networks, virtual networks, mesh networks, peer-to-peer networks, and/or other interconnected data paths across which multiple devices may communicate. In embodiments, the network 112 is coupled to or includes portions of a telecommunications network for sending data in a variety of different communication protocols. In some implementations, the network 112 includes Bluetooth® communication networks or a cellular communications network for sending and receiving data including via short messaging service (SMS), multimedia messaging service (MMS), hypertext transfer protocol (HTTP), direct data connection, WAP, email, and the like.

The central bank implements a country's digital currency system by setting the rules and auditing the system. To this end, the central bank 102 includes one or more servers 114 and data stores 116 that enable the central bank to manage and monitor the zkCBDC banking system. The commercial banks 104 provide various CBDC banking services, such as making payments to merchants using CBDCs, saving CBDCs, transferring CDBCs, and the like. To this end, each bank 104 includes a banking system 118 for processing CBDC transactions and a transaction database 120 for storing bank state (e.g., account balances). The bank regulatory agencies 108 monitor the zkCBDC banking system to ensure that banks operate safely and legally, and protect consumers from predatory practices. A user device 110 is a computing device, such as a personal computer, desktop computer, laptop, smart phone, tablet, smart watch, gaming console, smart television, and the like. Each computing device 110 includes at least one banking application 114 which provides a user interface, security measures, and other tools for interacting with the commercial banks 104 and performing transactions, such depositing, withdrawing, and transferring CBDCs.

As discussed above, the zkCBDC banking system according to the present disclosure uses zero-knowledge proofs based on bank state commitment information in conjunction with blockchain verification to ensure transaction privacy and system correctness, and to achieve bank decentralization in order to avoid central points of vulnerability in the system to cyber threats. To this end, the zkCBDC banking system 102 includes a blockchain system 106 that provides a blockchain 124 for storing bank state commitment values for each bank 104 associated with the zkCBDC banking system 102. A blockchain is a distributed database or ledger used to record and verify transaction data across multiple computing nodes in a secure, transparent, and tamper-proof manner. The data is stored in blocks which are linked together cryptographically to form a blockchain. Each node in the system maintains a copy of the blockchain to ensure redundancy and resilience. The blockchain system 106 includes a smart contract 126 which serves as the verifiers for the zero-knowledge proofs received from the commercial banks.

Zero-knowledge proofs are received from the banks for each transaction performed by the banks. Each zero-knowledge proof includes (i) a new bank state commitment and (2) a commitment to transaction hashes The new bank state commitment cryptographically binds the bank to a particular state (e.g., balances of individual accounts). The latter cryptographically binds the proof to a list of transactions executed in a batch. The blockchain system includes a zero-knowledge proof verification component which processes each zero-knowledge proof to determine whether the new bank state commitment value represents a correct transition of the bank state for the corresponding transaction. If the proof received from a bank is verified, the current bank state commitment value of the bank is updated based on the new bank state commitment value and the updated bank state commitment value is added to a block in the blockchain. The zero-knowledge proofs do not reveal information pertaining to the underlying transaction which allows system correctness to be maintained and verified across transactions without having to reveal specific details of the transactions.

In various implementations, current bank state commitment values and new bank state commitment values are generated as hashes. A hash is the output of a cryptographic hash function, which takes an input of any size (e.g., account balances) and produces a fixed-size string, often represented as a hexadecimal number. Any suitable hash function can be used to generate bank state commitment values. Each hash acts as a unique identifier for the bank state commitment value it represents. The bank state commitment value cannot be altered without changing its hash so data integrity is preserved. Hashes are used as the basis for verifying proofs. The blockchain stores the hash representing each bank's state commitment value. The commitment value for a bank is updated only after a proof is verified, for example, by adding the hash value representing the new bank state commitment to the blockchain. Thus, the blockchain receives zero-knowledge proofs rather than transactions which enables system correctness to be verified without allowing access to transaction details so privacy can be maintained.

Figure 2:
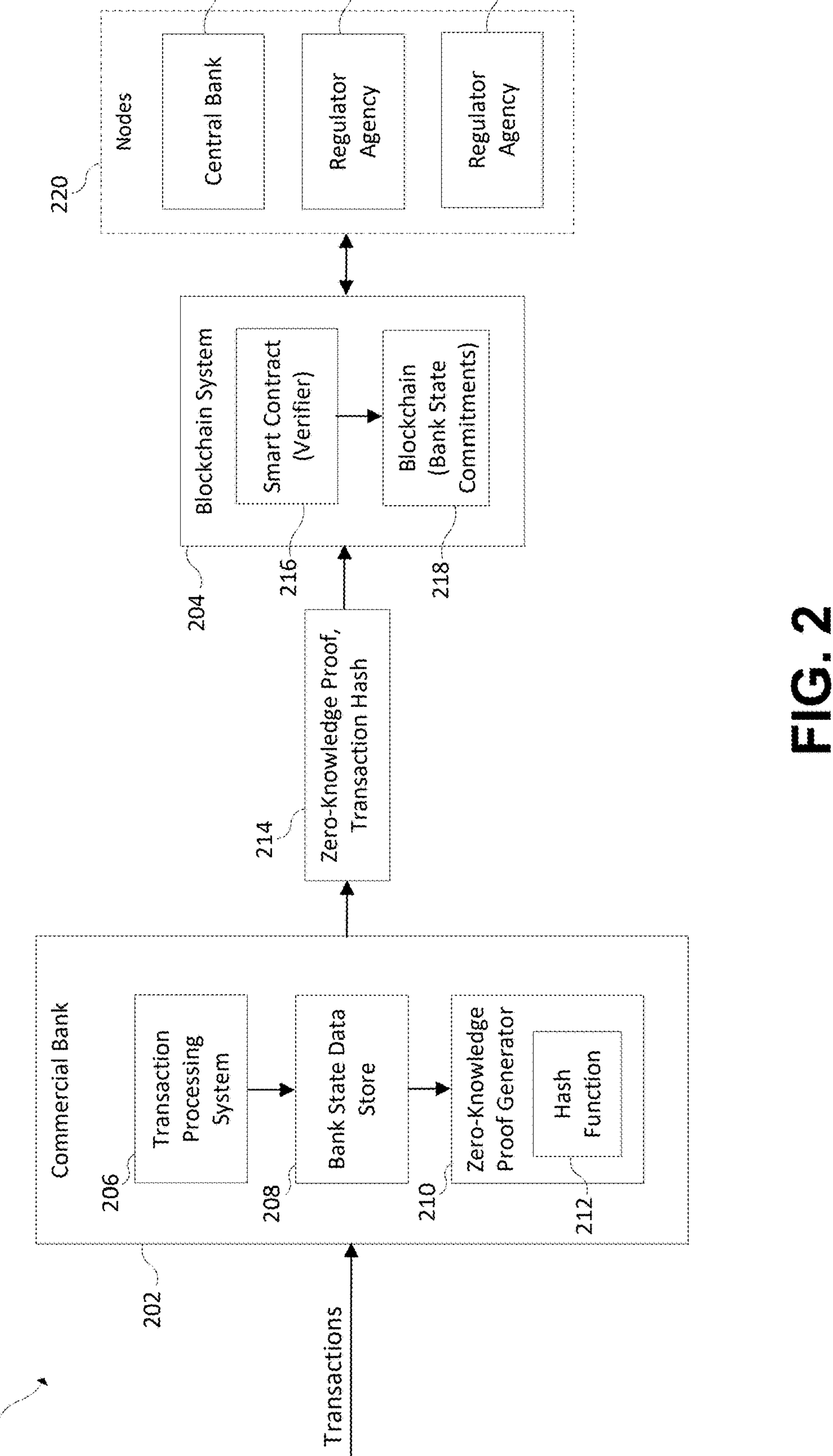
FIG. 2 depicts an example implementation of a central bank digital currencies (CBDC) banking system that may be used in the computing environment of FIG. 1.

An example diagram for demonstrating how zero-knowledge proofs are implemented for a zkCBDC system is shown in FIG. 2. FIG. 2 shows a commercial bank 202 a blockchain system 204. The commercial bank 202 includes a transaction processing component 206, a bank state database 208, and a zero-knowledge proof generating component 210. The transaction processing component 206 receives CBDC transactions from personal computing devices, other banks of the zkCBDC system, other financial institutions, merchant/retail systems, and the like. The transactions include transaction data, such as account information, the user or organization associated with the account, the type of transaction (e.g., deposit, withdrawal, transfer, swap, etc.), and, for some transactions, recipient information which identifies the person, organization, and/or account that is to receive CBDCs from the transaction. The transaction processing component 206 processes the transaction based on the transaction data. The bank's current bank state commitment is stored in the bank state data store 208. Once the transaction has been processed, the bank state is updated based on the newly performed transaction.

In various implementations, the zero-knowledge proof generating component 210 corresponds to a prover in the zero-knowledge proof scheme. The zero-knowledge proof generating component is configured to process at least one transaction performed by the transaction processing component to generate a zero-knowledge proof 214 for the at least one transaction. The zero-knowledge proof 214 is based on transition in bank state that results from processing the at least one transaction. In particular, the transition in bank state corresponds to the change in CBDC balance of the bank, the account associated with the transaction, a group of accounts associated with the transaction, or other suitable physical or logical grouping or division of accounts or CBDCs. The zero-knowledge proof generating component 210 generates the proof by providing the at least one transaction as input to a predetermined hash function 212 to generate a transaction hash. In some implementations, the zero-knowledge proof generating component 210 is configured to process transactions in batches. A batch includes a predetermined number of transaction. Any suitable number of transactions may be included in a batch. In this implementation, the proof generating component 210 waits until the predetermined number of transactions for a batch have been performed and then generates a single proof for the whole batch. In this case, the value of the change in bank state that results from processing the whole batch of transactions is provided as input to the hash function to generate the transaction hash.

In various implementations, commercial banks (i.e., provers) and the blockchain (i.e., verifier) use an agreed upon algorithm for generating and verifying zero-knowledge proofs. The verifier is implemented as a "smart contract" on a blockchain. As such, it holds a dictionary containing each bank's state commitment in the blockchain. The verifier contract also includes code to verify a proof. The verifier is generated with some verification material, which is analogous to public keys in digital signature schemes, but for the purposes of verifying zero-knowledge proofs. This verification material is provided by the central bank and cryptographically encodes the rules of transaction processing (e.g., defining rules such as no creation or destruction of money, no double spending, etc.). The verifier verifies the proof based on the verification material and the nodes (e.g., central bank and regulatory agencies) validate the proof. The central bank and regulatory agencies serve as nodes for the blockchain, so that once a proof from a bank is verified/validated, the smart contract updates its dictionary entry for the bank. In various implementations, the zero-knowledge proof scheme implemented by the zkCBDC banking system is a succinct, non-interactive scheme. This means that proofs can be verified without requiring back and forth communication between prover and verifier (i.e., non-interactive) and can be verified based on a single message from prover to verifier (i.e., succinct). In this case, the zero-knowledge proof comprises a plurality of bytes. A transaction hash of the bank state for which the zero-knowledge proof is generated is included with the zero-knowledge proof. The transaction hash is short enough to write to the blockchain. Verifications can therefore be performed quickly, e.g., within a few milliseconds.

As each zero-knowledge proof 214 is generated (e.g., per transaction and/or per batch), the proof is communicated to the blockchain system 204. The blockchain system 204 includes a smart contract 216 which is stored on the blockchain. The smart contract 2216 includes code which implements a verification scheme (e.g., digital signature scheme) and includes at least one verification value (e.g., public key) for verifying proof. The smart contract also encodes the rules of transaction processing (e.g., defining rules such as no creation or destruction of money, no double spending, etc.). The smart contract receives the zero-knowledge proof 114 from the commercial bank and verifies the zero-knowledge proof based on the verification scheme and verification values. Once a zero-knowledge proof is verified, the nodes for the blockchain validate the zero-knowledge proof and the transaction hash. Once validated, the smart contract can update the bank state value for the commercial bank 202 in the blockchain and also store the one or more transaction hashes associated with the zero-knowledge proof.

In various implementations, the zkCBDC banking system enables anyone in the system to verify the end-to-end correctness of the system. In addition, only participants of a transaction can see the details of transactions. For example, participants of the system can access transaction details via the banks. This information is not accessible via the blockchain. The system is decentralized so that it has no central points of vulnerability which can be targeted for security attacks. Decentralization also enables the system to continue processing transactions even if some parties which are not part of a transaction crash.

Figure 3:
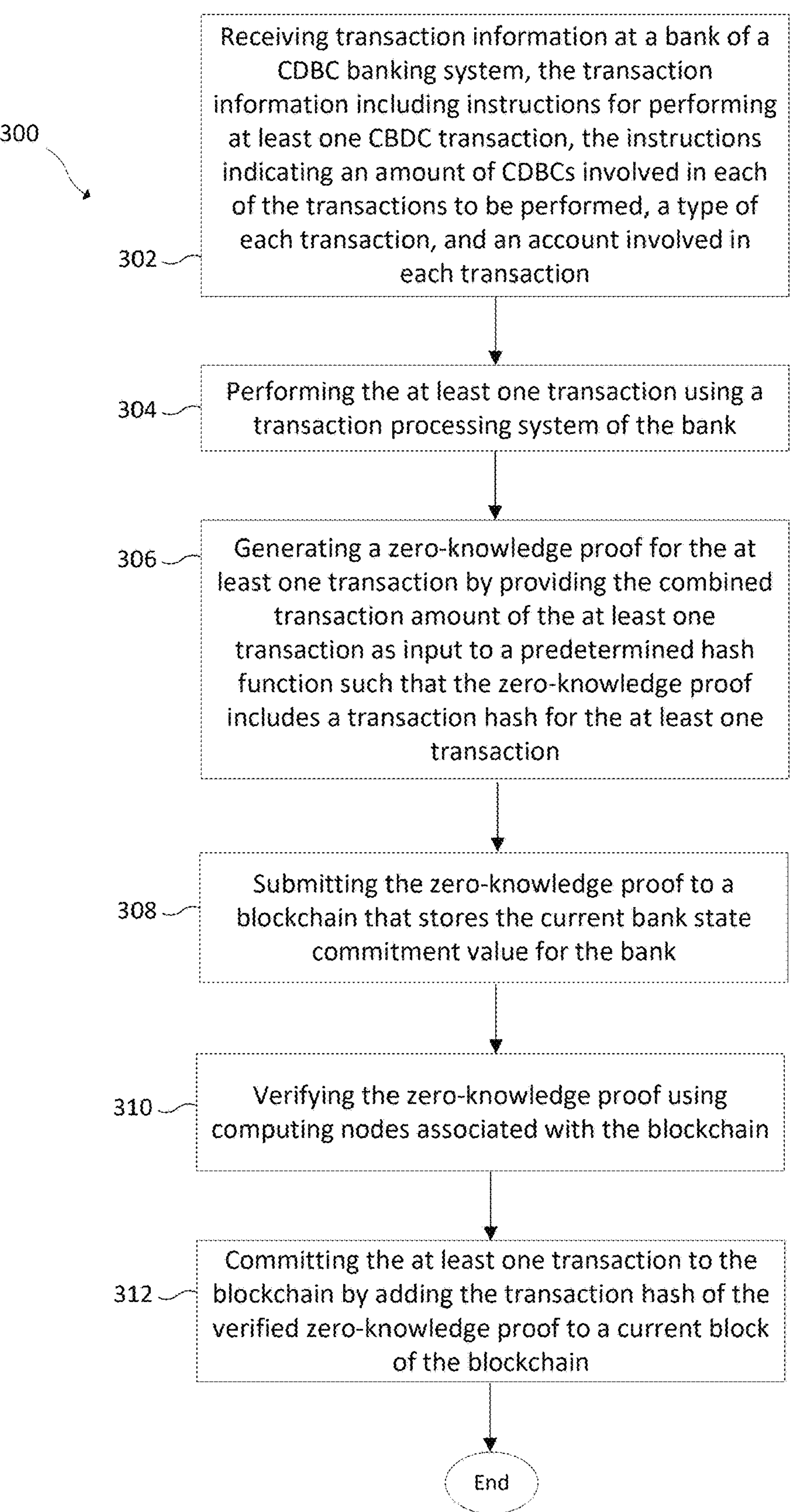
FIG. 3 shows a flowchart of an example method of implementing zero-knowledge CBDC (zkCBDC).

A flowchart of an example method 300 of implementing zkCBDC banking is shown in FIG. 3. The method 300 begins with receiving transaction information at a bank of a CDBC banking system (block 302). The transaction information includes instructions for performing at least one CBDC transaction, the instructions indicating an amount of CDBCs involved in each of the transactions to be performed, a type of each transaction, and an account involved in each transaction. Each of the at least one transactions is then performed using the transaction processing system of the bank (block 304). A zero-knowledge proof is then generated for the at least one transaction by providing the combined transaction amount of the at least one transaction as input to a predetermined hash function such that the zero-knowledge proof includes a transaction hash for the at least one transaction (block 306). The zero-knowledge proof is then submitted to a blockchain that stores the current bank state commitment value for the bank (block 308). The zero-knowledge proof is then verified using computing nodes associated with the blockchain (block 310). Once verified, the at least one transaction is committed to the blockchain by adding the transaction hash of the verified zero-knowledge proof to a current block of the blockchain (block 312).

Figure 4:
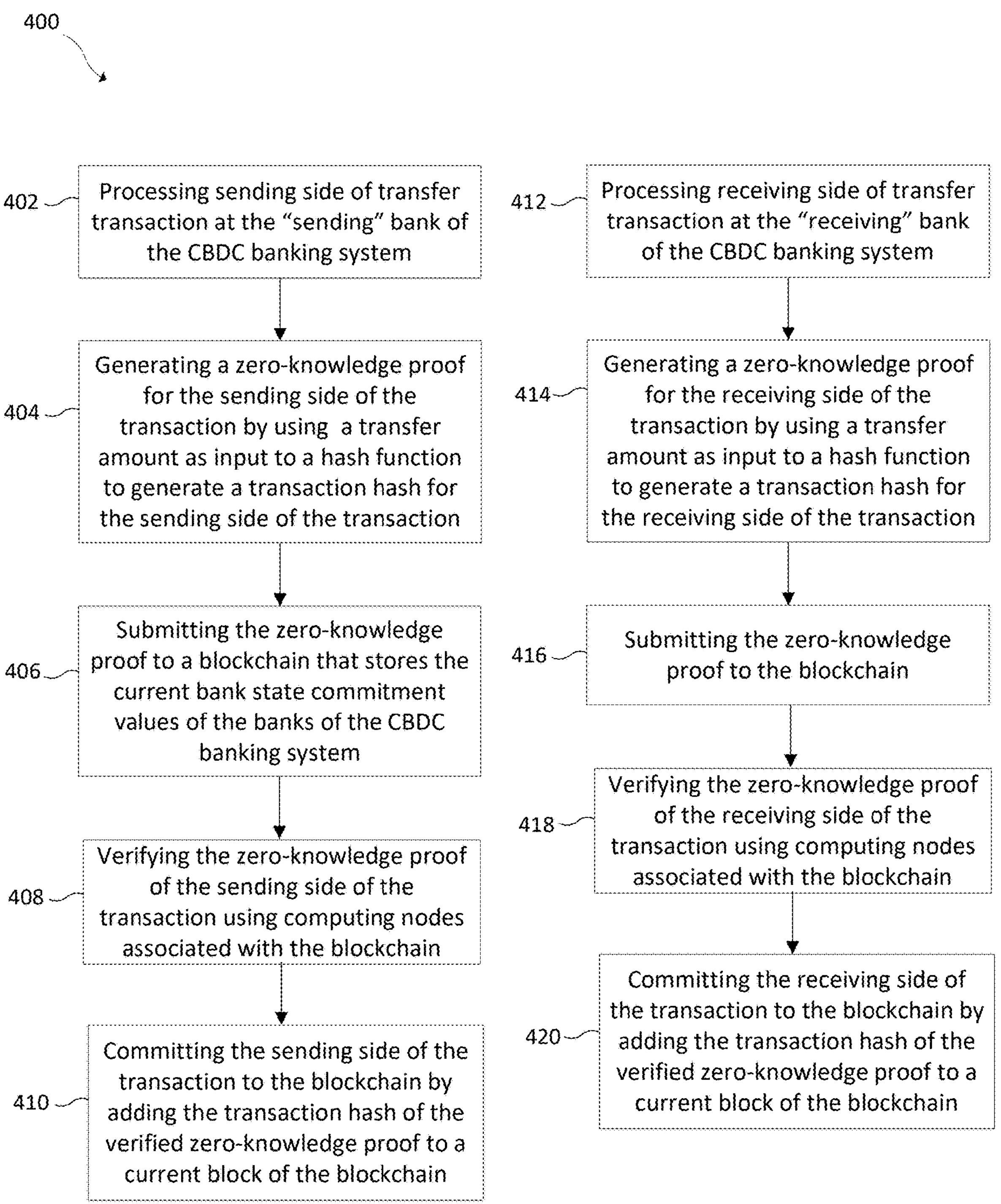
FIG. 4 shows a flowchart of an example method of performing bank-to-bank transfers in a zkCBDC banking system that uses a two-phase commit protocol.

The blockchain facilitates cross-bank transactions, such as transfers and swaps, using a two-phase commit protocol. In various implementations, a two-phase commit protocol is used to facilitate cross-bank transfers and swaps in the zkCBDC banking system. An example implementation of a method 400 for bank-to-bank CBDC transfers using a two-phase commit protocol is shown in FIG. 4. The method 400 begins with the "sending" bank (i.e., the bank that is dispersing CBDCs) beginning to perform the sending side of the transaction (block 402). The sending bank generates a zero knowledge proof for the sending transaction by using the transfer amount of the transaction as input to a hash function to generate a transaction hash for the sending side of the transaction (block 404), and the zero-knowledge proof for the sending transaction is submitted to the blockchain for verification (block 406). The proof is verified by the nodes associated with the blockchain (block 408), and the sending side of the transaction is committed to the blockchain by adding the transaction hash associated with the sending side of the transaction to the latest block of the blockchain (block 410).

Once the sending side of the transaction has been committed to the blockchain, the bank on the receiving side of the transaction (i.e., the bank that receives the transferred CBDCs) begins processing the receiving side of the transaction (block 412). The receiving bank generates a zero knowledge proof for the receiving side of the transaction by using the transfer amount as input to a hash function to generate a transaction hash for the receiving side of the transaction (block 414. The zero-knowledge proof for the receiving side of the transaction is then submitted to the blockchain for verification (block 416). The proof is verified by the nodes associated with the blockchain (block 418), and the receiving side of the transaction is then committed to the blockchain by adding the transaction hash associated with the receiving side of the transaction to the latest block of the blockchain (block 420).

Figure 5:
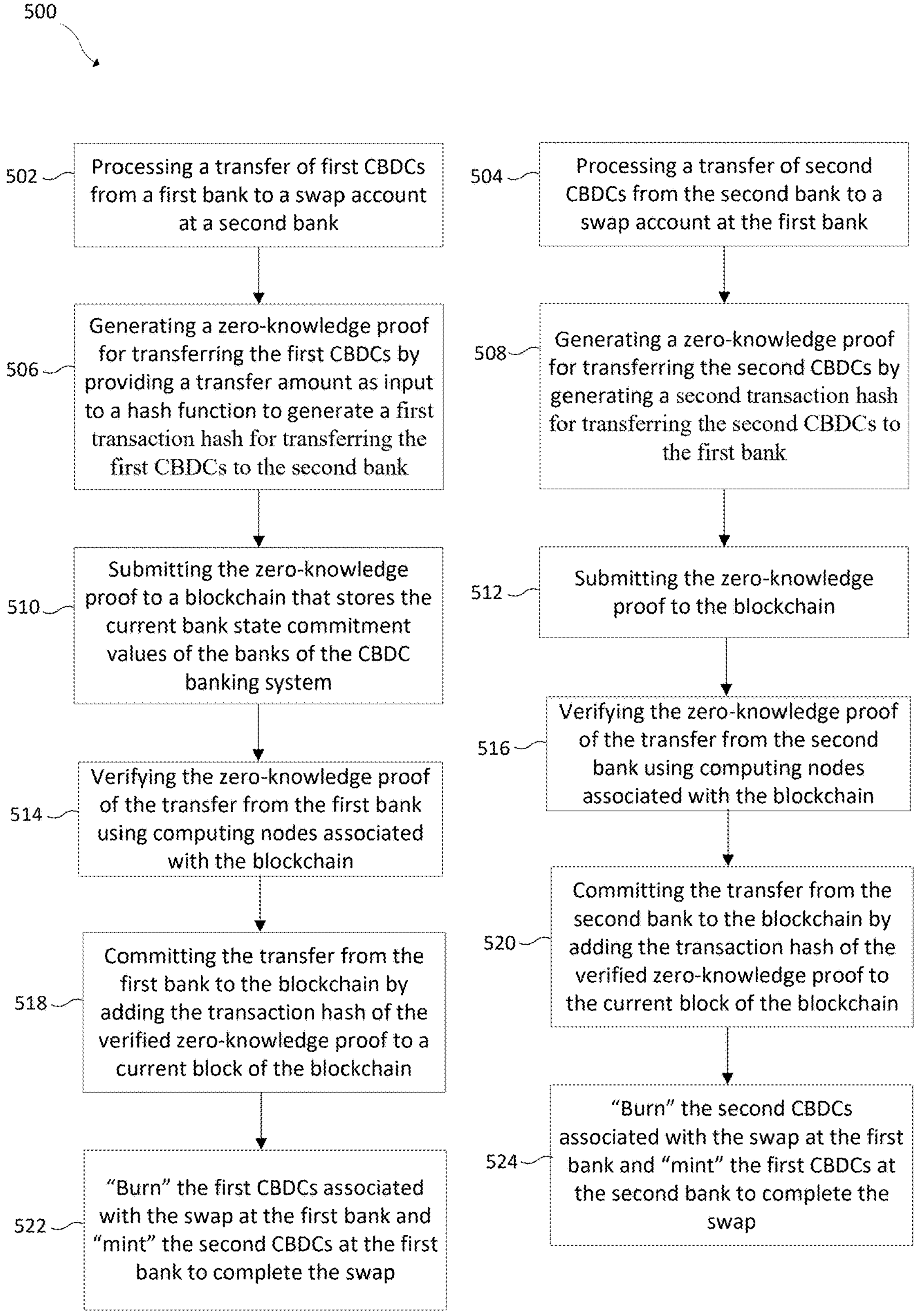
FIG. 5 shows a flowchart of an example method of performing bank-to-bank swaps in a zkCBDC banking system that uses a two-phase commit protocol.

An example implementation of a method 500 for bank-to-bank CBDC swaps using a two-phase commit protocol is shown in FIG. 5. For the method 500, a swap is being performed to swap first CBDCs associated with a first bank for second CBDCs associated with a second bank. For swaps, each bank has a swap account which can be used to hold CBDCs that are subject to the swap in a manner similar to an escrow. To perform the swap, the first bank transfers a predetermined amount of first CBDCs to the swap account of the second bank (block 502), and the second bank transfers a predetermined amount of second CBDC's to the swap account of the first bank (block 504). The predetermined amounts of first and second CBDC's which are transferred can be based on an agreed upon or contracted exchange rate. Once both banks have added their CBDC assets to the swap accounts of the other bank, the first bank generates a zero-knowledge proof for transferring the first CBDCs by providing a transfer amount as input to a hash function to generate a first transaction hash for transferring the first CBDCs to the swap account of the second bank (block 506). Similarly, the second bank generates a zero-knowledge proof for transferring the second CBDCs by providing a transfer amount as input to a hash function to generate a second transaction hash for transfer the second CBDCs to the swap account at the first bank (block 508). The zero-knowledge proof for the transfer of first CBDCs from the first bank is then submitted a blockchain that stores the current bank state commitment values of the banks of the CBDC banking system (block 510). The same thing is done for the zero-knowledge proof generated by the second bank (block 512). The proofs are verified by the nodes of the blockchain (blocks 514 and 516) and then committed to the blockchain by adding the transaction hashes for the transfers from the first and second banks to the blockchain (block 518 and 520).

Once both banks have escrowed their assets and committed the transfers on the blockchain, the first bank "burns" the first CBDCs which have been transferred to the second bank and "mints" the second CBDCs which have been transferred from the second bank (block 522). Similarly, the second bank "burns" the second CBDCs which have been transferred to the second bank and "mints" the first CBDCs which have been transferred from the first bank (block 524). In the context of CBDCs, burning and minting refer to the mechanisms by which the supply of CBDCs is managed. Burning refers to the process by which CBDCs are eliminated and/or removed from circulation. Minting refers to the process by which new CBDCs are created and added to circulation. For swaps, transactions can be canceled within a predetermined time period while the asset is in escrow. Furthermore, swaps can be performed such that both sides of the swap must succeed for the swap to be committed. Otherwise, the swap is canceled.

Figure 6:
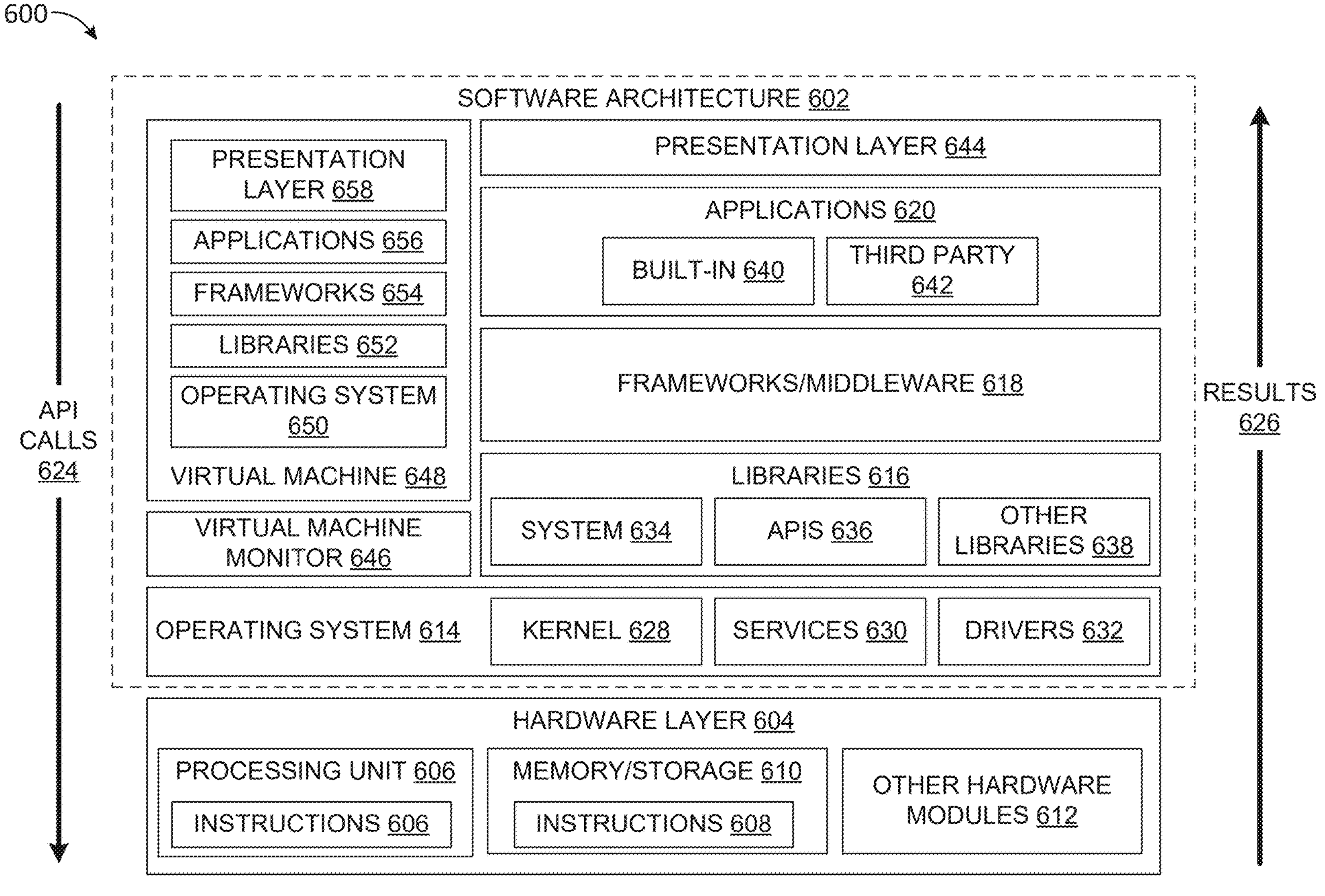
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
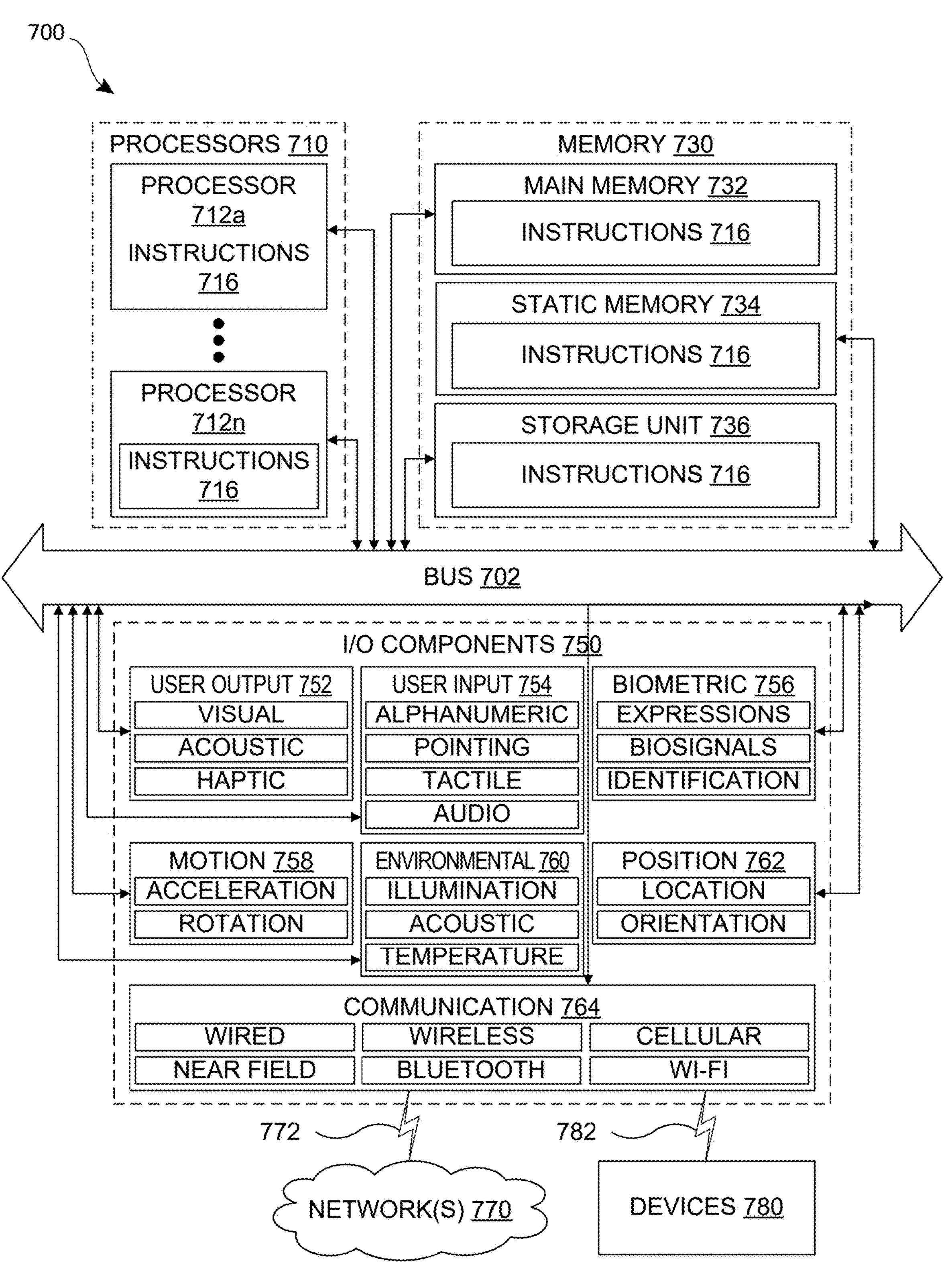
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors **712*a* to 712*n* that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700** may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system for a central bank digital currency (CBDC) banking system, the data processing system comprising:
- a processor; and
- a memory in communication with the processor, the memory comprising executable instructions that, when executed by the processor alone or in combination with other processors, cause the data processing system to perform functions of
  - receiving transaction information at a commercial bank of the CBDC banking system, the transaction information including instructions for performing at least one transaction, the instructions indicating an amount of CBDCs involved in each transaction, a transaction type for each transaction, and an account involved in each transaction;
  - processing the at least one transaction using a transaction processing system of the commercial bank;
  - providing a transaction amount pertaining to the at least one transaction to a predetermined hash function;
  - generating a transaction hash for the at least one transaction using the predetermined hash function;
  - generating a zero-knowledge proof for the at least one transaction using a zero-knowledge proof generating component;
  - submitting the zero-knowledge proof and the transaction hash to a blockchain of the CBDC banking system, the blockchain storing a bank state commitment value for the commercial bank, the bank state commitment value representing a current bank balance for the commercial bank;
  - verifying the zero-knowledge proof using a smart contract stored on the blockchain, the smart contract including code for verifying zero-knowledge proofs;
  - validating the zero-knowledge proof and the transaction hash using nodes of the blockchain; and
  - in response to the validation of the zero-knowledge proof and the transaction hash, (i) updating the bank state commitment value in the blockchain by updating the current bank balance with the transaction amount pertaining to the at least one transaction and (ii) adding the transaction hash to the blockchain.

2. The data processing system of claim 1, wherein the functions further comprise:
- storing the zero-knowledge proof in the blockchain.

3. The data processing system of claim 1, wherein the at least one transaction comprises a batch of transactions, the batch having a predetermined number of transactions, the transaction amount being a total amount of CBDCs associated with the batch of transactions.

4. The data processing system of claim 1, wherein transaction hashes stored in the blockchain enable end-to-end-correctness of transaction processing by the commercial bank to be verified by the nodes of the blockchain, the nodes comprising at least one of a central bank and a regulatory agency.

5. The data processing system of claim 1, wherein:
- the at least one transaction comprises a sending side of a transfer transaction performed by the commercial bank to a second bank of the CBDC banking system, and
- wherein the functions further comprise:
  - after the sending side of the transfer transaction is committed to the blockchain, receiving transaction information pertaining to a receiving side of the transfer transaction from the second bank;
  - processing the receiving side of the transfer transaction using a transaction processing system of the second bank;
  - generating a zero-knowledge proof for the receiving side of the transfer transaction by providing a transfer amount as input to the predetermined hash function to generate a transaction hash for the receiving side of the transfer transaction;
  - submitting the zero-knowledge proof for the receiving side of the transfer transaction to the blockchain of the CBDC banking system;
  - verifying the zero-knowledge proof for the receiving side of the transfer transaction using the nodes of the blockchain, the nodes verifying the zero-knowledge proof for the receiving side of the transfer transaction by validating the transaction hash of the zero-knowledge proof for the receiving side of the transfer transaction; and committing the receiving side of the transfer transaction to the blockchain by storing the transfer transaction in a current block of the blockchain.

6. The data processing system of claim 1, wherein the functions further comprise:

performing a swap transaction between a first bank and a second bank of the CBDC banking system wherein the first bank swaps first CBDCs for second CBDCs from a second bank;

transferring the first CBDCs from the first bank to a swap account at the second bank;

transferring the second CBDCs from the second bank to a swap account at the first bank;

generating a first zero-knowledge proof for transferring the first CBDCs from the first bank, the first zero-knowledge proof including a first transaction hash;

generating a second zero-knowledge proof for transferring the second CBDCs from the second bank, the second zero-knowledge proof including a second transaction hash;

submitting the first and the second zero-knowledge proof to the blockchain of the CBDC banking system; verifying the first zero-knowledge proof and the second zero-knowledge proof using the nodes of the blockchain, the nodes verifying the first zero-knowledge proof and the second zero-knowledge proof by validating the first transaction hash and the second transaction hash; and committing the swap transaction to the blockchain by storing the first transaction hash and the second transaction hash in a current block of the blockchain.

7. The data processing system of claim 6, wherein the functions further comprise:

after the swap transaction has been committed to the blockchain:

burning the first CBDCs and minting the second CBDCs at the first bank which were part of the swap transaction; and burning the second CBDCs and minting the first CBDCs at the second bank which were part of the swap transaction.

8. A method of processing transactions in a central bank digital currency (CBDC) banking system, the method comprising:

receiving transaction information at a commercial bank of the CBDC banking system, the transaction information including instructions for performing at least one transaction, the instructions indicating an amount of CBDCs involved in each transaction, a transaction type for each transaction, and an account involved in each transaction;

processing the at least one transaction using a transaction processing system of the commercial bank;

providing a transaction amount pertaining to the at least one transaction to a predetermined hash function;

generating a transaction hash for the at least one transaction using the predetermined hash function; generating a zero-knowledge proof for the at least one transaction that includes the transaction hash;

submitting the zero-knowledge proof to a blockchain of the CBDC banking system, the blockchain storing a current bank state commitment value for the commercial bank, the bank state commitment value representing a current bank balance for the commercial bank;

verifying the zero-knowledge proof using a smart contract stored on the blockchain, the smart contract including code for verifying zero-knowledge proofs;

validating the zero-knowledge proof and the transaction hash using nodes of the blockchain; and in response to the validation of the zero-knowledge proof and the transaction hash, (i) updating the bank state commitment value in the blockchain by updating the current bank balance with the transaction amount pertaining to the at least one transaction and (ii) adding the transaction hash to the blockchain.

9. The method of claim 8, wherein the blockchain stores only zero-knowledge proofs for transactions.

10. The method of claim 8, wherein the at least one transaction comprises a batch of transactions, the batch having a predetermined number of transactions, the transaction amount being a total amount of CBDCs associated with the batch of transactions.

11. The method of claim 8, wherein transaction hashes stored in the blockchain enable end-to-end correctness of transaction processing by the commercial bank to be verified.

12. The method of claim 8, wherein:

the at least one transaction comprises a sending side of a transfer transaction performed by the commercial bank to a second bank of the CBDC banking system, and wherein the method further comprises:

after the sending side of the transfer transaction is committed to the blockchain, receiving transaction information pertaining to a receiving side of the transfer transaction from the second bank;

processing the receiving side of the transfer transaction using a transaction processing system of the second bank;

generating a zero-knowledge proof for the receiving side of the transfer transaction by providing a transfer amount as input to the predetermined hash function to generate a transaction hash for the receiving side of the transfer transaction;

submitting the zero-knowledge proof for the receiving side of the transfer transaction to the blockchain of the CBDC banking system;

verifying the zero-knowledge proof for the receiving side of the transfer transaction using the nodes of the blockchain, the nodes verifying the zero-knowledge proof for the receiving side of the transfer transaction by validating the transaction hash of the zero-knowledge proof for the receiving side of the transfer transaction; and committing the receiving side of the transfer transaction to the blockchain by storing the transfer transaction in a current block of the blockchain.

13. The method of claim 8, further comprising:

performing a swap transaction between a first bank and a second bank of the CBDC banking system wherein the first bank swaps first CBDCs for second CBDCs from a second bank;

transferring the first CBDCs from the first bank to a swap account at the second bank;

transferring the second CBDCs from the second bank to a swap account at the first bank;

generating a first zero-knowledge proof for transferring the first CBDCs from the first bank, the first zero-knowledge proof including a first transaction hash;

generating a second zero-knowledge proof for transferring the second CBDCs from the second bank, the second zero-knowledge proof including a second transaction hash;

submitting the first and the second zero-knowledge proof to the blockchain of the CBDC banking system;

verifying the first zero-knowledge proof and the second zero-knowledge proof using the nodes of the blockchain, the nodes verifying the first zero-knowledge proof and the second zero-knowledge proof by validating the first transaction hash and the second transaction hash; and committing the swap transaction to the blockchain by storing the first transaction hash and the second transaction hash in a current block of the blockchain.

14. The method of claim 13, further comprising:

after the swap transaction has been committed to the blockchain:

burning the first CBDCs and minting the second CBDCs at the first bank which were part of the swap transaction; and burning the second CBDCs and minting the first CBDCs at the second bank which were part of the swap transaction.

15. A non-transitory computer readable medium on which are stored instructions that, when executed, cause a programmable device to perform functions of:

receiving transaction information at a bank of a CBDC banking system, the transaction information including instructions for performing at least one transaction, the instructions indicating an amount of CBDCs involved in each transaction, a transaction type for each transaction, and an account involved in each transaction;

processing the at least one transaction using a transaction processing system of the bank;

providing a transaction amount pertaining to the at least one transaction to predetermined hash function;

generating a transaction hash for the at least one transaction using the predetermined hash function;

generating a zero-knowledge proof for the at least one transaction that includes the transaction hash;

submitting the zero-knowledge proof to a blockchain of the CBDC banking system, the blockchain storing a current bank state commitment value for the bank, the current bank state commitment value representing a current bank balance for the bank;

verifying the zero-knowledge proof using a smart contract stored in the blockchain, the smart contract including code for verifying zero-knowledge proofs;

validating the zero-knowledge proof and the transaction hash using nodes of the blockchain; and in response to the validation of the zero-knowledge proof and the transaction hash, (i) updating the bank state commitment value in the blockchain by updating the current bank balance with the transaction amount pertaining to the at least one transaction and (ii) adding the transaction hash to the blockchain.

16. The non-transitory computer readable medium of claim 15, wherein the blockchain stores only zero-knowledge proofs for transactions.

17. The non-transitory computer readable medium of claim 15, wherein the at least one transaction comprises a batch of transactions, the batch having a predetermined number of transactions, the transaction amount being a total amount of CBDCs associated with the batch of transactions.

18. The non-transitory computer readable medium of claim 15, wherein:

the at least one transaction comprises a sending side of a transfer transaction performed by the bank to a second bank of the CBDC banking system, and wherein the functions further comprise:

after the sending side of the transfer transaction is committed to the blockchain, receiving transaction information pertaining to a receiving side of the transfer transaction from the second bank;

processing the receiving side of the transfer transaction using a transaction processing system of the second bank;

generating a zero-knowledge proof for the receiving side of the transfer transaction by providing a transfer amount as input to the predetermined hash function to generate a transaction hash for the receiving side of the transfer transaction;

submitting the zero-knowledge proof for the receiving side of the transfer transaction to the blockchain of the CBDC banking system;

verifying the zero-knowledge proof for the receiving side of the transfer transaction using the nodes of the blockchain, the nodes verifying the zero-knowledge proof for the receiving side of the transfer transaction by validating the transaction hash of the zero-knowledge proof for the receiving side of the transfer transaction; and committing the receiving side of the transfer transaction to the blockchain by storing the transfer transaction in a current block of the blockchain.

19. The non-transitory computer readable medium of claim 15, wherein the functions further comprise:

performing a swap transaction between a first bank and a second bank of the CBDC banking system wherein the first bank swaps first CBDCs for second CBDCs from a second bank;

transferring the first CBDCs from the first bank to a swap account at the second bank;

transferring the second CBDCs from the second bank to a swap account at the first bank;

generating a first zero-knowledge proof for transferring the first CBDCs from the first bank, the first zero-knowledge proof including a first transaction hash;

generating a second zero-knowledge proof for transferring the second CBDCs from the second bank, the second zero-knowledge proof including a second transaction hash;

submitting the first and the second zero-knowledge proof to the blockchain of the CBDC banking system;

verifying the first zero-knowledge proof and the second zero-knowledge proof using the nodes of the blockchain, the nodes verifying the first zero-knowledge proof and the second zero-knowledge proof by validating the first transaction hash and the second transaction hash; and committing the swap transaction to the blockchain by storing the first transaction hash and the second transaction hash in a current block of the blockchain.

20. The non-transitory computer readable medium of claim 19, wherein the functions further comprise:

after the swap transaction has been committed to the blockchain:

burning the first CBDCs and minting the second CBDCs at the first bank which were part of the swap transaction; and burning the second CBDCs and minting the first CBDCs at the second bank which were part of the swap transaction.

* * * * *